United States Patent
Lutgen et al.

(10) Patent No.: US 9,209,925 B2
(45) Date of Patent: Dec. 8, 2015

(54) PASSIVE OPTICAL NETWORKING REDUNDANCY VIA TWO OR MORE AUTO SENSING OPTICAL LINE TERMINALS

(71) Applicant: Tellabs Bedford, Inc., Naperville, IL (US)

(72) Inventors: Craig L. Lutgen, Richardson, TX (US); Thomas R. Dobozy, Frisco, TX (US); Mahlon D. Kimbrough, Sherman, TX (US)

(73) Assignee: Tellabs Bedford, Inc., Naperville, IL (US)

( * ) Notice: Subject to any disclaimer, the term of this patent is extended or adjusted under 35 U.S.C. 154(b) by 153 days.

(21) Appl. No.: 13/796,807

(22) Filed: Mar. 12, 2013

(65) Prior Publication Data

US 2014/0270770 A1  Sep. 18, 2014

(51) Int. Cl.
*H04J 14/02* (2006.01)
*H04Q 11/00* (2006.01)

(52) U.S. Cl.
CPC ........ *H04J 14/0221* (2013.01); *H04Q 11/0067* (2013.01); *H04Q 2011/0081* (2013.01)

(58) Field of Classification Search
CPC .............. H04J 14/0281; H04J 14/0226; H04J 14/0221; H04B 10/272
USPC ........................................ 398/66, 43, 2, 5, 17
See application file for complete search history.

(56) References Cited

U.S. PATENT DOCUMENTS

| | | | |
|---|---|---|---|
| 2006/0093356 A1* | 5/2006 | Vereen et al. | 398/33 |
| 2007/0143645 A1* | 6/2007 | Haran | 714/704 |
| 2007/0242954 A1* | 10/2007 | Sackman | 398/71 |
| 2008/0138064 A1* | 6/2008 | O'Byrne et al. | 398/25 |
| 2009/0202242 A1* | 8/2009 | Niibe et al. | 398/63 |
| 2009/0274471 A1* | 11/2009 | Bowler et al. | 398/197 |
| 2010/0008667 A1* | 1/2010 | Kim et al. | 398/58 |
| 2010/0183298 A1* | 7/2010 | Biegert et al. | 398/17 |
| 2010/0247098 A1* | 9/2010 | Nesset et al. | 398/58 |
| 2010/0296811 A1* | 11/2010 | Ohira et al. | 398/72 |
| 2011/0013903 A1* | 1/2011 | Rafel Porti et al. | 398/1 |
| 2011/0087925 A1* | 4/2011 | Haran | 714/37 |
| 2012/0020662 A1* | 1/2012 | Ding et al. | 398/38 |
| 2012/0251097 A1* | 10/2012 | Elmardini et al. | 398/5 |
| 2013/0089316 A1* | 4/2013 | Trojer et al. | 398/2 |
| 2013/0195439 A1* | 8/2013 | Mangin | 398/2 |
| 2014/0270770 A1* | 9/2014 | Lutgen et al. | 398/66 |

* cited by examiner

*Primary Examiner* — Oommen Jacob

(74) *Attorney, Agent, or Firm* — Hamilton, Brook, Smith & Reynolds, P.C.

(57) ABSTRACT

An embodiment of the invention provides communications services to Optical Network Terminals (ONTs) in a Passive Optical Network (PON) with at least two Optical Line Terminals (OLTs). The role of these OLTs is autonomously governed based on characteristics of upstream signals from the ONTs. When an OLT in a standby mode determines that upstream signal power is below a power threshold, the OLT in standby mode changes its mode and operates in the active mode. An OLT in active mode monitors the upstream signals and determines the number of upstream signals that are misaligned to a respective downstream command sent from the active OLT. When the number of misaligned signals is greater than a counts threshold, the active OLT switches its operation and operates in standby mode. Through autonomous operation, the OLTs provide redundancy for the PON without added control channel complexity.

22 Claims, 7 Drawing Sheets

PASSIVE OPTICAL NETWORKING REDUNDANCY VIA TWO OR MORE AUTO SENSING OPTICAL LINE TERMINALS

BACKGROUND OF THE INVENTION

In many communications systems, a centralized controller element communicates with one or more distributed endpoints via one or more communications channels that provide a communications medium. Unless that medium is a closed point-to-point transmission channel, the system must employ some form of a shared media access technique to allow multiple endpoints to communicate to the centralized controller. For typical configurations, these types of shared medium connection systems provide a single controller to mediate access to the channel used by numerous client endpoints.

One such type of communications system is a passive optical network (PON). A PON is a type of fiber optic access network. Specifically, passive optical networking may be used in what the industry refers to as the "last mile," i.e., the portion of a telecommunications network that actually connects to a residence of an end user, e.g., a home. A typical PON uses an unpowered optical splitter/combiner to enable a single optical fiber to serve multiple premises. A typical PON implementation may provide access to network communications via optical fiber to home users.

SUMMARY OF THE INVENTION

A system and corresponding method, according to an embodiment of the present invention, provide communications services in a Passive Optical Network (PON). An embodiment of the present invention includes a primary optical line terminal (OLT) operating in an active mode, e.g., transmitting downstream signals, optically coupled to an optical splitter combiner (OSC). Further, coupled to the OSC are multiple optical network terminals (ONTs). The ONTs are typically located in a residence, such as a house. Also coupled to the OSC is a secondary or backup OLT. This secondary OLT is configured to enter the active mode, e.g., transmit downstream signals, in response to detecting a level of upstream signal power from the ONTs below a power threshold. This secondary OLT may also be configured to enter the active mode in response to detecting no upstream signal power from the ONTs coupled to the OSC.

Another embodiment of the present invention is directed to an OLT that may be used in a PON. According to an embodiment of the invention, the OLT employs a counts module configured to detect a number of misaligned upstream signals relative to a respective downstream command transmitted from the OLT. The OLT also employs a power detection module configured to detect a level of upstream signal power. Further the OLT includes a control module configured to modify the operation of the OLT, causing the OLT to operate in an active mode or a standby mode.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In a typical Passive Optical Network (PON), an Optical Line Terminal (OLT) is connected to a core network via a fiber optic cable that supports for example dense wave division multiplexing (DWDM) communications signals. In this typical PON, the OLT is, in turn, optically connected via a fiber cable to an Optical Splitter/Combiner (OSC). From the OSC, fiber optic cables connect to Optical Network Terminals (ONTs), such as thirty-two ONTs. These ONTs may be the endpoints of the network, and, in an example embodiment, may be at respective users' homes.

In this typical PON, the OLT and the cable connecting the OLT to the OSC are possible points of failure. If either the OLT or the cable connecting the OLT to the OSC should fail, all ONTs connected to that OSC will no longer be able to provide communications services, in both upstream and downstream directions. An embodiment of the present invention provides communications services in a PON that has redundant OLTs and corresponding cabling.

Figure 1:
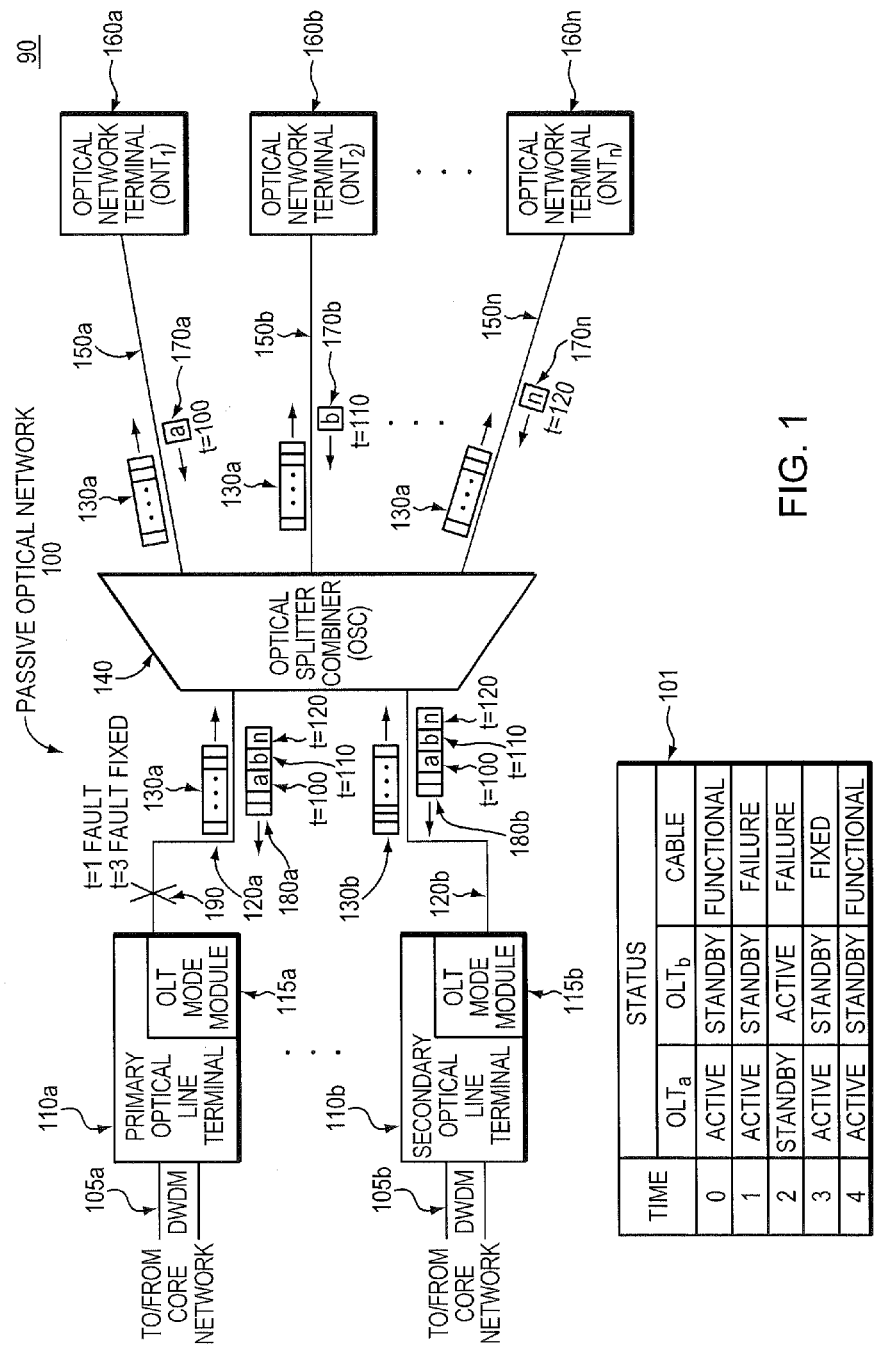
FIG. 1 is a simplified block diagram of a Passive Optical Network (PON), having primary and secondary Optical Line Terminals (OLTs) associated therewith, according to an embodiment of the present invention.

FIG. 1 shows a simplified block diagram of a network 90 according to an embodiment of the present invention. The network 90 includes DWDM cabling 105a and 105b and a PON 100, which includes passive optical elements. The DWDM cabling 105a and 105b provides a connection to and from the core network (not shown) to OLTs 110a, 110b, and a PON 100. For ease of description, the PON 100 is described herein as including the OLTs 110a, and 110b, although the OLTs are active components. The PON 100 contains a primary OLT 110a. Also within the PON 100 is a secondary OLT 110b. The primary OLT 110a and the secondary OLT 110b each may contain corresponding OLT mode modules 115a and 115b that may be employed to cause the OLTs to switch between active and standby operating modes, sometimes referred to herein as "active mode" and "standby mode."

While only a single backup OLT is depicted, the secondary OLT 110b, an embodiment of the invention may use any number of backup OLTs connected to the PON 100 in a similar connection arrangement as the secondary OLT 110b. Additional elements of the PON 100 are the fiber optic cables 120a and 120b and 150a-n, which serve as interconnections between the PON 100 elements. The PON 100 also includes an OSC 140 and ONTs 160a-n. The PON 100 may include any number of ONTs, and an embodiment of the invention may include thirty-two ONTs.

In an embodiment of the present invention, the above-described elements of the PON 100 are interconnected in a manner that allows the PON 100 to provide communications services to network endpoints, such as the ONTs 160a-n. For example, in an embodiment, the primary OLT 110a is connected to the core network via one of the DWDM cables 105a. Likewise, the secondary OLT 110b is similarly connected to the core network via another one of the DWDM cables 105b. Coupled to the primary OLT 110a and the secondary OLT 110b are respective OLT mode modules 115a and 115b. As mentioned above, the OLT mode modules 115a and 115b provide logic to cause the primary and secondary OLTs, 110a and 110b to switch between active and standby modes, where further details of their operations may be those as described hereinbelow with respect to FIG. 6. The primary OLT 110a and its respective OLT mode module 115a may be connected via cabling 120a to the OSC 140. The secondary OLT 110b, and its respective OLT mode module 115b, are likewise connected via cabling 120b to the OSC 140. The OSC 140 is, in turn, connected via cabling 150a-n to the respective ONTs 160a-n.

A description of the data flow of the PON according to an example embodiment of the invention is now described. The status of the PON 100 at any given time may be summarized in a state table, such as the state table 101 depicted in FIG. 1. At time zero, the PON 100 is operating according to "normal" procedure. The primary OLT 110a is in active mode, e.g., the primary OLT 110a is transmitting data. The secondary OLT 110b is operating in standby mode, e.g., the secondary OLT 110b is monitoring upstream signals, and the cabling 120a and 120b is fully functional. Under normal operation, the primary OLT 110a sends downstream data, such as data 130a, to the ONTs 160a-n. This downstream data 130a contains the data needed at each end point (i.e., at the ONTs 160a-n), and the downstream data 130 also contains a schedule, sometimes referred to as a grant map (not shown), for enabling the ONTs 160a-n to send upstream data transmissions. This grant map dictates when the ONTs 160a-n can send upstream data, such as the data 170a-n, upstream to the OLTs. The grant map typically includes indicators of clock cycles each ONT must transmit upstream signals after a downstream start-of-frame signal is received by the respective ONT, so as not to interfere with upstream signals of other ONTs.

When operating under normal conditions, such as at time zero, the primary OLT 110a transmits the data 130a, with a respective grant map or respective information from the grant map, through the cable 120a to the OSC 140. The data 130a may be received at the primary OLT 110a from the core network via the DWDM cable 105a. The OSC 140 splits the optical signal carrying the data 130a and sends the data 130a and the respective grant map or portion thereof via cabling 150a-n to each ONT 160a-n. Each ONT 160a-n then recovers from the data 130a, the respective data intended for the respective ONT, as well as the relevant information from the grant map, if needed.

In an embodiment, the data 130a may be encrypted such that each ONT may only recover its own respective data from the data 130a. During normal operations, data is sent upstream from the ONTs 160a-n according to the received grant map. This, in effect, causes each ONT 160a-n to operate in a burst mode when sending data. For example, the downstream data 130a may contain a grant map stating that the first ONT 160a may transmit data at time t=100, the second ONT 160b may transmit data at time t=110, and the nth ONT 160n may transmit data at time t=100+10n. The ONTs 160a, 160b, and 160n, then transmit their respective upstream data 170a, 170b, and 170n in accordance with the upstream timing provided by the grant map information. The time an ONT has to transmit upstream data may vary depending upon the embodiment of the invention. According to an embodiment of the present invention, each ONT has an equal time in which to transmit upstream data, while in an alternative embodiment, the time for transmitting upstream data is dynamically altered (e.g., a given ONT is allotted two or three upstream timeslots).

When operating normally, such as at time t=0, the data 170a-n is carried via optical wavelengths from the ONTs 160a-n via the cables 150a-n to the OSC 140. The OSC 140 then combines the wavelengths with the data 170a-n and sends the upstream signals via the cables 120a and 120b to the primary OLT 110a and the secondary OLT 110b, respectively. Throughout the above-described normal operation, the secondary OLT 110b is operating in a standby mode. The standby mode operation according to an embodiment of the invention is described herein in relation to FIG. 2.

Described above is the operation of the PON 100 according to normal operation procedure. However, the PON 100 provides communications services outside of normal conditions, as well. The state table 101 describes the status of the PON 100 when operating under non-normal conditions, where an example of non-normal conditions is a cable fault, as indicated at time t=1. At time t=1, the primary OLT 110a is operating in active mode and transmitting data as described above, and the secondary OLT 110b is operating in standby mode, as described above. However, at time t=1, cable failure 190 occurs. When the cable failure 190 occurs, the primary OLT 110a can neither transmit nor receive data, and the secondary OLT 110b takes over the role of transmitting OLT (i.e., the secondary OLT switches operation to active mode and supports upstream and downstream communications on the PON 100). If a cable failure such as failure 190 occurs and/or the primary OLT 110a should fail, the secondary OLT 110b enters active mode and continues to provide communications services to the ONTs 160a-n in a manner similar to the operation described above. The logic for this switchover is described herein with relation to FIGS. 2-5.

In the PON 100, a cable failure 190 occurs at time t=1, then at time t=2, the primary OLT 110a is operating in standby mode and the secondary OLT 110b is operating in active mode. At time t=3, the cable failure 190 is fixed, and once the failure 190 is fixed, the primary OLT 110a returns to operating in active mode and the secondary OLT 110b returns to operating in standby mode. While in respect to this example embodiment the failure has been described as a cable failure; it should be understood that a similar procedure may also be followed if, for example, the primary OLT 110a is instead the point of failure.

According to an embodiment of the present invention, the above-described OLT switchover is determined by the OLTs 110a and 110b. According to an embodiment of the invention, each OLT determines what state to operate in by examining the upstream signals (e.g., optical power) from the ONTs and the respective signal characteristics. Through this autonomous operation, the OLTs provide redundancy of communications services to the PON without added control channel complexity. Because an embodiment of the present invention utilizes OLTs configured to determine their operational state based upon upstream signal power or upstream signal characteristics, autonomous redundancy is provided without the added complexity of a control layer or cabling between the OLTs.

While the net effect and overall logic of an embodiment of the invention have been described hereinabove, there are numerous other embodiments of the invention. In one such embodiment the downstream schedule from the OLT operating in active mode is a Time Division Multiple Access (TDMA) Grant Map. In another embodiment of the invention the secondary OLT is configured to operate in standby mode when the secondary OLT detects a number of misaligned signals from the ONTs greater than a counts threshold relative to a downstream signal sent to the ONTs from the secondary OLT. An example embodiment of the present invention may utilize a primary OLT configured to enter active mode in response to detecting no signals from the ONTs, such an operation may be used in relation to system initialization. Further, an embodiment of the invention may provide additional redundancy by utilizing a tertiary OLT configured to operate in a manner similar to the secondary OLT. While the description of the above embodiments refers generally to a PON, an embodiment of the present invention may be used in a Gigabit-capable Passive Optical Network (GPON), Ethernet Passive Optical Network (EPON), or Broadband Passive Optical Network (BPON). An embodiment of the invention may also provide for further network security by placing the primary OLT and the secondary OLT in respective geographically separated locations.

Further, an example embodiment of the invention provides reversion redundancy, i.e., returning the primary OLT back to active mode, after a failure where the primary OLT switched to standby operation. According to such an embodiment, the primary OLT is configured to transmit a downstream command periodically to the ONTs while the primary OLT is in standby mode. Further, the primary and secondary OLTs are configured such that if both the primary OLT and the secondary OLT are transmitting downstream commands, the downstream command from the primary OLT has signal power that is sufficient to allow the ONTs to transmit upstream signals aligned to the downstream commands transmitted from the primary OLT.

Another embodiment of the invention may alternatively utilize OLTs configured such that if both the primary OLT and the secondary OLT are in active mode, upstream signal power is below the power threshold or there are no upstream signals.

While above, the system has generally been described, further detail for determining failures and OLT switchover is described hereinbelow with relation to FIGS. 2-5.

Figure 2:
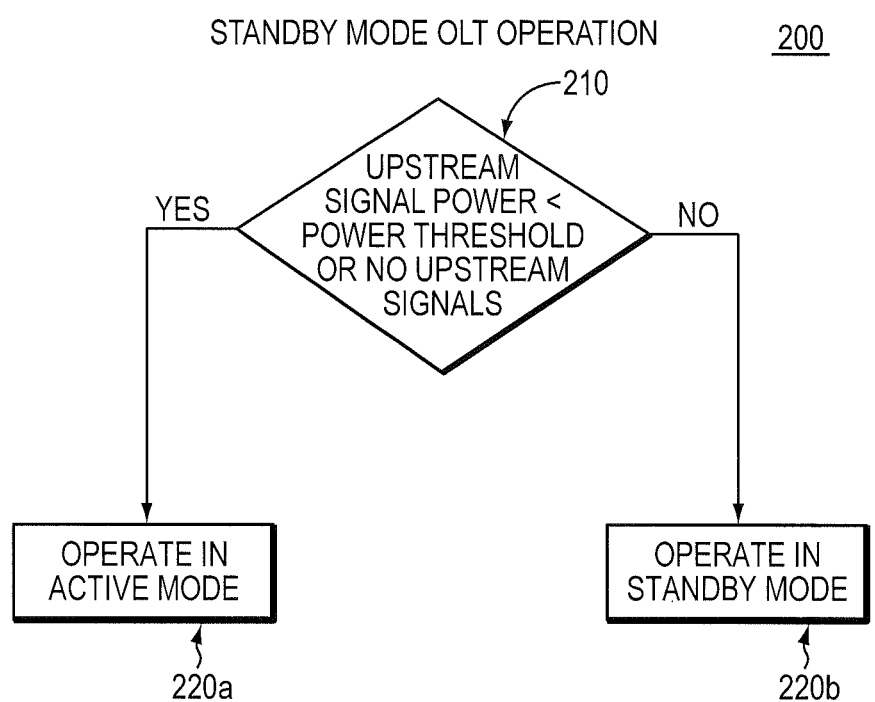
FIG. 2 is a flowchart depicting operation of an OLT in a standby mode.

FIG. 2 is a flowchart 200 depicting the logic of an OLT in standby mode, such as the secondary OLT 110b at time t=0. According to an embodiment of the present invention, a standby OLT monitors upstream signal power (210). For example, this may be the secondary OLT 110b monitoring the upstream signal 180b. If the upstream signal power dips below a power threshold, then the OLT switches from standby mode to operate in active mode (220a). Similarly, if no upstream signals are detected by the OLT in standby mode, the OLT also switches from standby mode to operate in active mode (220a). However, if upstream signal power is above the power threshold, and upstream signals are detected, the OLT in standby mode continues to operate in standby mode (220b). The OLT in standby mode may constantly monitor upstream signal power in order to determine the correct mode of operation. To illustrate this operation, an example is presented in relation to the PON 100 depicted in FIG. 1. First, it should be noted that, as described above, the ONTs transmit upstream signals according to a respective downstream grant map; therefore, if there is a cable failure, such as the cable failure 190, no downstream grant map is received by the ONTs. Thus, the secondary OLT, such as the OLT 110b, either detects no upstream signals or detects signal power below a power threshold. When either condition is determined, the OLT in standby mode, such as the secondary OLT 110b, switches operation to operate in active mode, so that communications services may still be provided in the PON 100.

Figure 3:
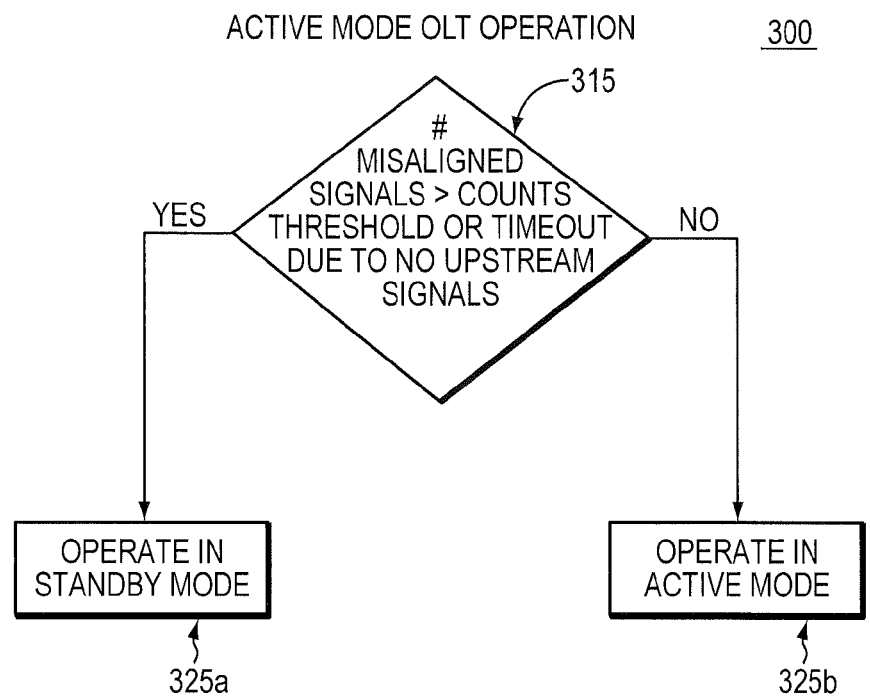
FIG. 3 is a flowchart depicting operation of an OLT in an active mode.
Figure 4:
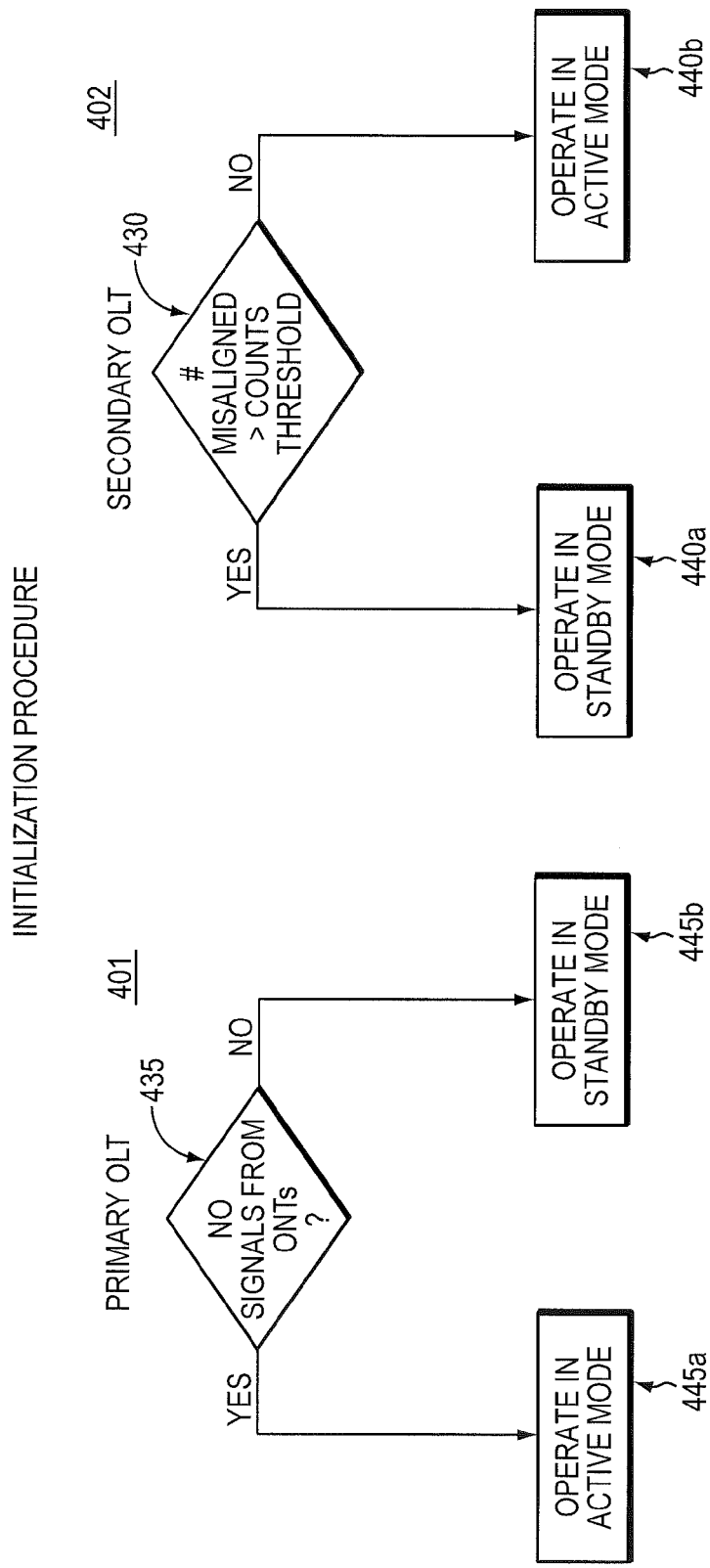
FIG. 4A is a flowchart depicting an initialization procedure of a primary OLT according to an embodiment of the invention.
FIG. 4B is a flowchart depicting the initialization procedure of a secondary OLT according to an embodiment of the invention.

FIG. 3 is a flowchart 300 depicting the operation of an OLT in active mode according to an embodiment of the invention. At time t=0 an OLT in active mode, such as the OLT 110a, monitors the upstream signals, such as the upstream signal 180a, for misaligned signals and similarly monitors for a timeout due to no upstream signals (315). Misaligned signals are signals that do not line up with a respective grant map sent downstream from the OLT in active mode. As described above, the OLT in active mode sends a grant map downstream, and the attached ONTs only send upstream data in time slots according to the downstream grant map. When upstream signals from ONTs do not correspond to the respective time slots of a downstream grant map, the signals are considered misaligned. Misaligned signals indicate that the ONTs are transmitting data according to a grant map sent from another OLT. If the active OLT detects a number of misaligned signals greater than a counts threshold or detects that no upstream signals are being received, for example in the case of a cable failure, then the active OLT goes into standby mode (325a). However, if the active OLT detects upstream signals that are aligned to a grant map sent from the active OLT, the active OLT continues to operate in active mode (325b).

FIG. 4A is a flowchart 401 depicting the initialization procedure of a primary OLT. During initialization, the primary OLT monitors for signals from ONTs (435). If the primary OLT detects signals from ONTs, then the primary OLT operates in standby mode (445b). If the primary OLT detects no signals from ONTs, then the primary OLT goes into active mode (445a).

FIG. 4B is a flowchart 402 depicting the initialization procedure for a secondary OLT. During initialization, the secondary OLT monitors for a number of misaligned signals, i.e., detects signals misaligned to a grant map sent from the secondary OLT (430). If the secondary OLT detects a number of misaligned signals greater than a counts threshold, the secondary OLT operates in a standby mode (440a). If the secondary OLT detects a number of misaligned signals less than a particular counts threshold, then the secondary OLT operates in an active mode (440b).

According to an embodiment of the invention, upon system initialization, the primary OLT is powered on first, so that the primary OLT, which is configured to operate in accordance with FIG. 4A, operates in the active mode. In an alternative embodiment of the invention each OLT is powered simultaneously and the primary OLT is configured, as described herein with relation to the reversion redundancy, to take over operation as the active mode OLT if it does not take that role upon system initialization.

Figure 5:
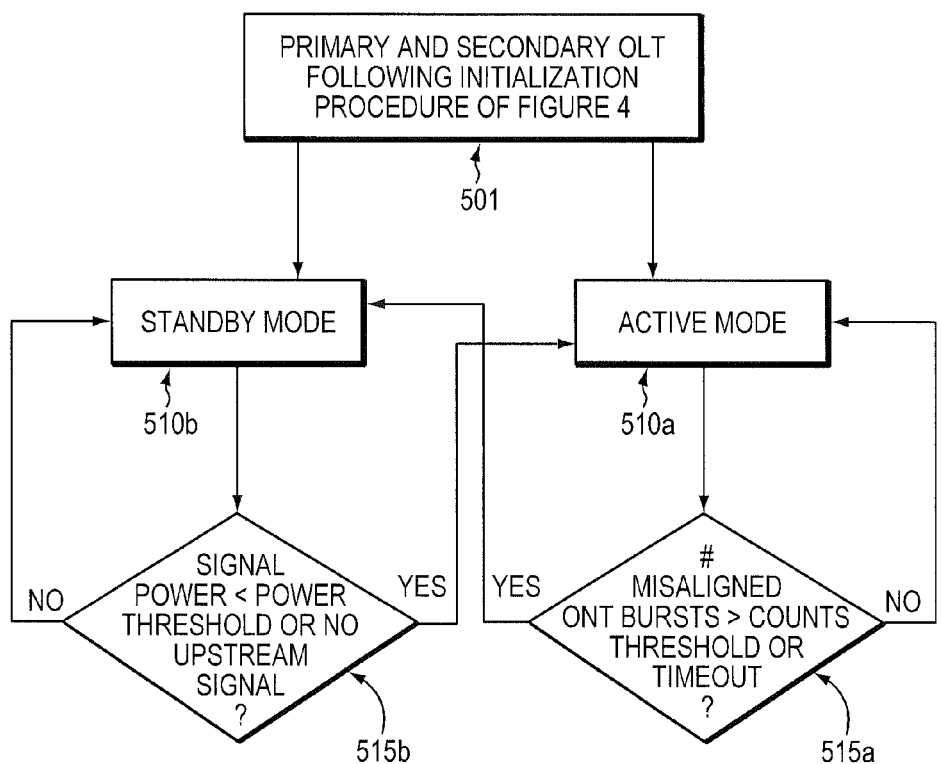
FIG. 5 is an OLT state diagram that OLTs may be configured to follow.

FIG. 5 is a state diagram of OLT operation 500. According to an embodiment of the present invention, every OLT in a PON, such as the PON 100, may be configured to operate in accordance with the state diagram 500. Upon initialization, each OLT operates in accordance with the initialization flow charts depicted in FIG. 4A and FIG. 4B (501). After following the initialization procedure 501, an OLT is either in standby mode 510b or active mode 510a.

When an OLT is in standby mode, the OLT monitors signal power to determine if signal power dips below a certain power threshold and/or determines if there are no upstream signals from ONTs (515b). If signal power dips below a power threshold or there are no upstream signals, then the standby mode OLT operates in active mode (510a). If signal power stays above the power threshold and upstream signals from ONTs are detected, then the standby mode OLT continues to operate in standby mode (510*b*).

When an OLT is in active mode, the OLT monitors upstream signals looking for misaligned signals. If the number of misaligned signals is greater than a counts threshold or there is a timeout, i.e., no upstream signals are detected, then the OLT in active mode operates in standby mode (510*b*). However, if the number of misaligned bursts from ONTs is less than the counts threshold and signals are being received from ONTs, then the active mode OLT continues to operate in active mode (510*a*).

An alternative embodiment of the invention provides for reversion redundancy. In such an embodiment the secondary OLT is configured to operate as described hereinabove. The primary OLT is similarly configured; except, the primary OLT is configured to periodically attempt to revert back to active mode operation when the primary OLT is operating in standby mode.

For example, consider the PON 100 of FIG. 1. Beginning at time t=0, as given by the state table 101, the primary OLT 110*a* is in active mode and the secondary OLT 110*b* is in standby mode and all cabling is fully functional. At time t=1 cable fault 190 occurs, and at time t=2 the primary OLT 110*a* is operating in standby mode, and the secondary OLT 110*b* is operating in active mode. These changes in operational modes occurs because the primary OLT 110*a* and the secondary OLT 110*b* monitor upstream signal power and characteristics as described hereinabove. At time t=3, the fault 190 is fixed and the primary OLT 110*a* operates in active mode and the secondary OLT 110*b* operates in standby mode. If for example, the primary OLT 110*a* was configured to operate in strict accordance with FIG. 5, this switch over would not occur. To illustrate, at time t=2 the primary OLT 110*a* is in standby mode and the secondary OLT 110*b* is in active mode. If the OLTs are programmed in accordance with FIG. 5, when the cable fault is fixed at time t=3, the primary OLT and the standby OLT will not change their respective modes of operation. This is because the primary OLT 110*a*, which at time t=2 is in standby mode, will not detect signal power below the power threshold and will detect upstream signals, and thus would continue to operate in standby mode. Similarly, OLT 110*b* will detect a number of misaligned signals greater than a counts threshold or a timeout and the secondary OLT 110*b* would continue to operate in the active mode.

In order for reversion to occur the primary OLT 110*a* and the secondary OLT 110*b*, must be particularly configured. In such an embodiment, the primary OLT, such as the OLT 110*a*, is configured to transmit a downstream command periodically to the ONTs when the primary OLT is operating in the standby mode. Further, the primary OLT and the secondary OLT are configured such that if both the primary OLT and the secondary OLT are simultaneously transmitting, the downstream commands from the primary OLT have signal power sufficient to allow the ONTs to transmit upstream signals aligned to the downstream commands transmitted from the primary OLT.

The PON 100 and the state table 101 illustrate such an embodiment. When the fault is fixed at time t=3, the primary OLT 110*a* which is configured to periodically attempt to regain active mode status, transmits downstream commands. Because the primary and secondary OLTs are so configured, the downstream commands from the primary OLT have signal power that is sufficient for the ONTs to transmit upstream signals aligned to the downstream commands from the primary OLT even when both the primary OLT and the secondary OLT are simultaneously transmitting. Now, because the fault 190 has been fixed and because the ONTs will transmit upstream signals according to the downstream commands from the primary OLT the primary OLT will operate in active mode. Further, because the upstream signals are aligned to downstream commands sent from the primary OLT 110*a*, the secondary OLT 110*a*, which at time t=2, was in active mode, will detect a number of misaligned signals from the ONTs greater than a counts threshold relative to downstream commands sent to the ONTs from the secondary OLT 110*b* and the secondary OLT 110*b* will change its operation to standby mode, thus completing the reversion redundancy.

Figure 6:
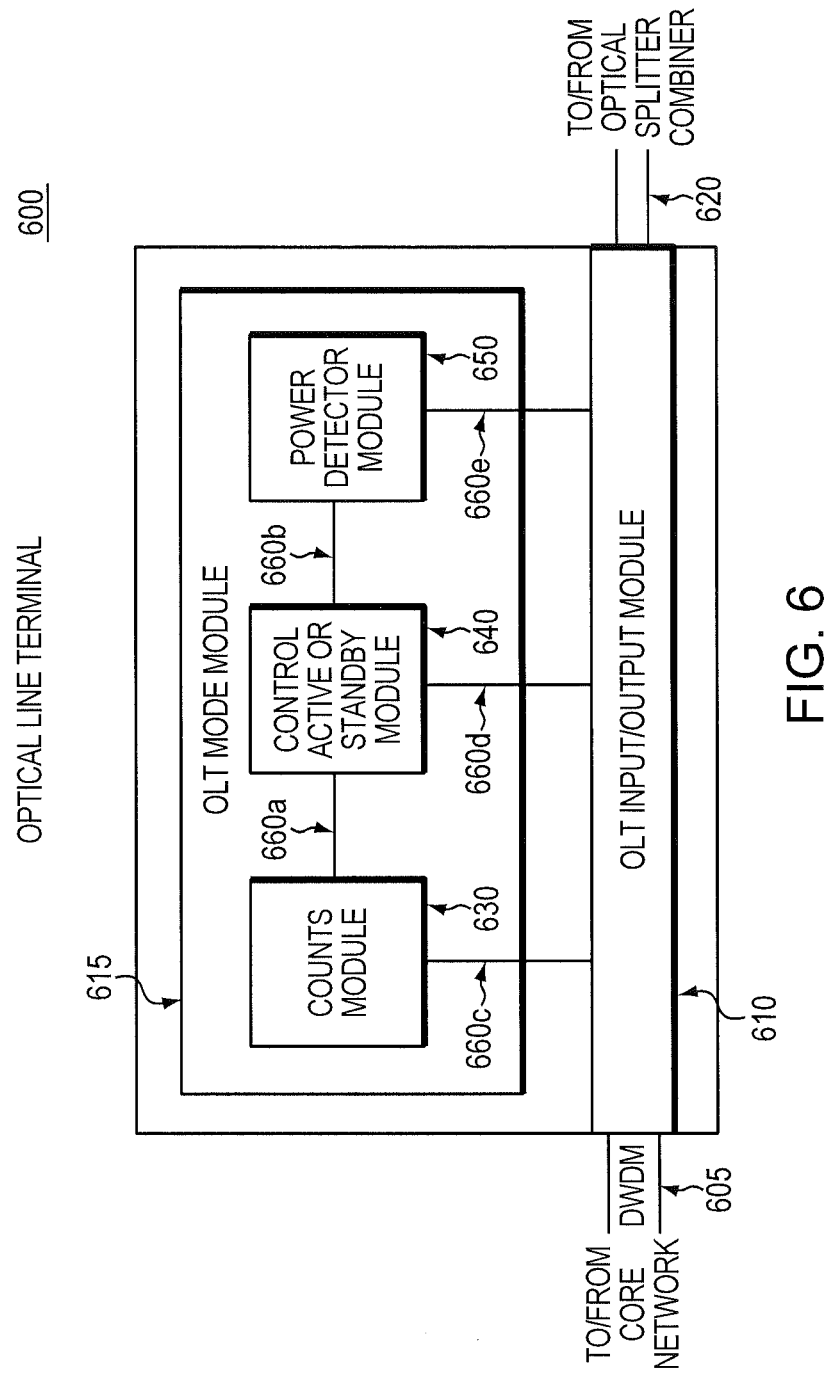
FIG. 6 is a simplified block diagram of an OLT according to an embodiment of the present invention.

FIG. 6 is a simplified block diagram of an OLT 600 according to an embodiment of the present invention. The OLT 600 includes an input/output module 610 for receiving data from, and sending data to, a core network and for receiving data from, and sending data to, ONTs via an OSC. Further coupled to the OLT 600 is an OLT mode module 615 with sub-modules: counts module 630, power detector module 650, and control active-or-standby module 640. The counts module 630 is configured to count misaligned bursts from ONTs, and the power detector module 650 is configured to determine upstream signal power. The control active-or-standby module 640 is configured to control the status of the OLT's 600 operation based upon input from the counts module 630 and the power detector module 650.

According to an embodiment of the invention, the OLT 600 is connected to the core network via a DWDM cable 605. This DWDM cable 605 connects to the OLT's input/output module 610. This input/output module 610 is further connected to an OSC via an interconnect 620. The input/output module 610 is connected to a power detector module 650 via an interconnect 660*e*, allowing the power detector module 650 to determine upstream signal power. The input/output module 610 is further connected to a counts module 630 via the interconnect 660*c*, allowing the counts module 630 to determine the number of misaligned upstream signals identified over a given time period.

The counts module 630 and the power detector module 650 are connected to a control active-or-standby module 640, via respective interconnects 660*a* and 660*b*. These interconnections 660*a* and 660*b* allow the control active-or-standby module 640 to determine whether the OLT 600 should be operating in active or standby mode based upon the information from the counts module 630 and the power detector module 650. This logic has been previously described above in relation to FIGS. 2-5. The control active-or-standby module 640 is connected to the input/output module 620 via an interconnect 660*d*, which allows the operation of the OLT 600 to be varied depending upon commands from the control active-or-standby module 640.

Figure 7:
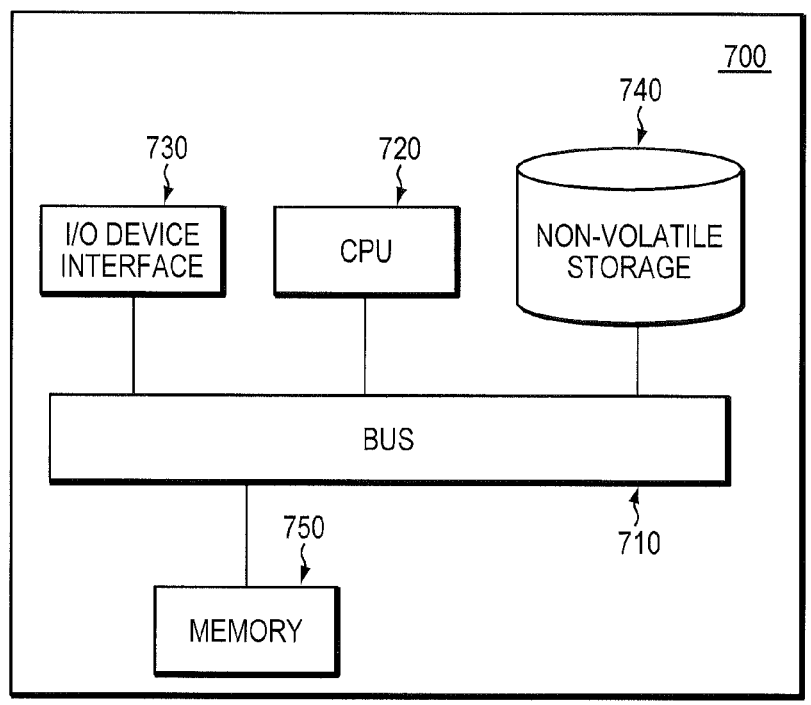
FIG. 7 is a simplified block diagram of a computer system in which the present invention may be embodied.

FIG. 7 is a high level block diagram of a computer system 700 in which embodiments of the present invention may be embodied. The system 700 contains a bus 710. The bus 710 is a connection between the various components of the system 700. Connected to the bus 710 is an input/output device interface 730 for connecting various input and output devices, such as a keyboard, mouse, display, speakers, etc. to the system 700. A Central Processing Unit (CPU) 720 is connected to the bus 710 and provides for the execution of computer instructions. Memory 750 provides volatile storage for data used for carrying out computer instructions. Disk storage 740 provides non-volatile storage for software instructions, such as an operating system (OS).

It should be understood that the example embodiments described above may be implemented in many different ways. In some instances, the various methods and machines described herein may each be implemented by a physical, virtual, or hybrid general purpose computer, such as the computer system 700. The computer system 700 may be transformed into the machines that execute the methods described above, for example, by loading software instructions into either memory 750 or non-volatile storage 740 for execution by the CPU 720.

Embodiments or aspects thereof may be implemented in the form of hardware, firmware, or software. If implemented in software the software may be stored on any non-transient computer readable medium that is configured to enable a processor to load the software or subsets of instructions thereof. The processor then executes the instructions and is configured to operate or cause an apparatus to operate in a manner as described herein.

While this invention has been particularly shown and described with references to example embodiments thereof, it will be understood by those skilled in the art that various changes in form and details may be made therein without departing from the scope of the invention encompassed by the appended claims.

What is claimed is:

1. A system for providing communications services in a Passive Optical Network (PON), the system comprising:
    a primary Optical Line Terminal (OLT) in an active mode optically coupled to an Optical Splitter/Combiner (OSC), the OSC optically coupled to Optical Network Terminal (ONTs); and
    a secondary OLT, optically coupled to the OSC, monitoring upstream signal power and configured to autonomously enter an active mode from a standby mode in response to detecting a level of upstream signal power below a power threshold or to detecting no upstream signal power from the ONTs and further configured to operate in the standby mode in response to detecting a number of misaligned signals from the ONTs greater than a counts threshold relative to a downstream signal sent to the ONTs from the secondary OLT.

2. The system of claim 1 wherein the primary OLT is configured to:
    operate in the standby mode in response to detecting a number of misaligned signals from the ONTs greater than a counts threshold, relative to a respective downstream command from the primary OLT; or
    operate in the standby mode in response to a timeout resulting from receiving no upstream signals from the ONTs.

3. The system of claim 2 wherein:
    the downstream command from the primary OLT is a Time Division Multiple Access (TDMA) Grant Map.

4. The system of claim 1 wherein the primary OLT is configured to operate in the active mode in response to detecting no signals from the ONTs.

5. The system of claim 1 further comprising a tertiary OLT configured to operate in a manner corresponding to the secondary OLT.

6. The system of claim 1 wherein the PON is a Gigabit-capable Passive Optical Network (GPON), Ethernet Passive Optical Network (EPON), or Broadband Passive Optical Network (BPON).

7. The system of claim 2 wherein:
    the primary OLT is configured to transmit a downstream command periodically to the ONTs when the primary OLT is operating in the standby mode; and
    signals from the ONTs are aligned to the downstream command from the primary OLT if both the primary OLT and the secondary OLT are simultaneously transmitting.

8. The system of claim 1 wherein:
    the primary OLT and the secondary OLT are in respective geographically separated locations.

9. A method for providing communication services in a Passive Optical Network (PON), the method comprising:
    by a secondary Optical Line Terminal (OLT) operating in a standby mode, optically coupled to an Optical Splitter/Combiner (OSC) having a primary OLT also optically coupled thereto, autonomously entering an active mode in response to detecting a level of upstream signal power below a power threshold or in response to detecting no upstream signals from Optical Network Terminals (ONTs) optically coupled to the OSC; and
    by the secondary OLT, entering the standby mode in response to detecting a number of misaligned signals from the ONTs greater than a counts threshold relative to a downstream signal sent to the ONTs from the secondary OLT.

10. The method of claim 9 further comprising at least one of the following:
    by the primary OLT operating in an active mode, entering the standby mode in response to detecting a number of misaligned signals from the ONTs greater than a counts threshold relative to a respective downstream command from the primary OLT; or
    by the primary OLT operating in an active mode, entering the standby mode in response to a timeout resulting from receiving no upstream signals from the ONTs.

11. The method of claim 10 wherein:
    the downstream command from the primary OLT is a Time Division Multiple Access (TDMA) Grant Map.

12. The method of claim 9 further comprising:
    by the primary OLT, entering the active mode in response to detecting no signals from the ONTs.

13. The method of claim 9 further comprising:
    by a tertiary OLT, operating in a manner corresponding to the secondary OLT.

14. The method of claim 9 wherein the PON is a Gigabit-capable Passive Optical Network (GPON), Ethernet Passive Optical Network (EPON), or Broadband Passive Optical Network (BPON).

15. The method of claim 10 further comprising:
    by the primary OLT, transmitting a downstream command periodically to the ONTs when the primary OLT is operating in the standby mode; and
    configuring the primary and the secondary OLT such that if both the primary and the secondary OLT are simultaneously transmitting, the downstream command from the primary OLT has a signal power sufficient to allow the ONTs to transmit upstream signals aligned to the downstream command transmitted from the primary OLT.

16. The method of claim 9 further comprising:
    carrying the upstream signals from the ONTs to the OLTs via geographically diverse communication paths between the OLTs and the OSC.

17. An Optical Line Terminal (OLT), comprising:
    a counts module configured to detect a number of misaligned upstream signals relative to a respective downstream command from the OLT;
    a power detection module configured to detect a level of upstream signal power; and
    a control module configured to autonomously cause the OLT to operate in a standby mode or an active mode, wherein the control module causes the OLT to enter the active mode from the standby mode in response to the power detection module detecting a level of upstream signal power below a power threshold or to detecting no upstream signal power from ONTs and further causes the OLT to operate in the standby mode in response to the counts module detecting a number of misaligned signals from the ONTs greater than a counts threshold relative to the downstream signal sent to the ONTs from the OLT.

18. A non-transitory computer readable medium having stored thereon a sequence of instructions which, when loaded and executed by a processor in a secondary Optical Line Terminal (OLT) operating in a standby mode, optically coupled to an Optical Splitter/Combiner (OSC) having a primary OLT also optically coupled thereto, autonomously causes the secondary OLT to:
   enter an active mode in response to detecting a level of upstream signal power below a power threshold or in response to detecting no upstream signals from Optical Network Terminals (ONTs) optically coupled to the OSC; and
   enter the standby mode in response to detecting a number of misaligned signals from the ONTs greater than a counts threshold relative to a downstream signal sent to the ONTs from the secondary OLT.

19. A system for providing communications services in a Passive Optical Network (PON), the system comprising:
   a primary Optical Line Terminal (OLT) in an active mode optically coupled to an Optical Splitter/Combiner (OSC), the OSC optically coupled to Optical Network Terminal (ONTs), wherein the primary OLT is configured to operate in a standby mode in response to detecting a number of misaligned signals from the ONTs greater than a counts threshold, relative to a respective downstream command from the primary OLT or operate in the standby mode in response to a timeout resulting from receiving no upstream signals from the ONTs; and
   a secondary OLT, optically coupled to the OSC, monitoring upstream signal power and configured to autonomously enter an active mode from a standby mode in response to detecting a level of upstream signal power below a power threshold or to detecting no upstream signal power from the ONTs.

20. The system of claim 19 wherein:
   the downstream command from the primary OLT is a Time Division Multiple Access (TDMA) Grant Map.

21. A method for providing communication services in a Passive Optical Network (PON), the method comprising:
   by a secondary Optical Line Terminal (OLT) operating in a standby mode, optically coupled to an Optical Splitter/Combiner (OSC) having a primary OLT also optically coupled thereto, autonomously entering an active mode in response to detecting a level of upstream signal power below a power threshold or in response to detecting no upstream signals from Optical Network Terminals (ONTs) optically coupled to the OSC; and
   by the primary OLT operating in an active mode, entering the standby mode in response to detecting a number of misaligned signals from the ONTs greater than a counts threshold relative to a respective downstream command from the primary OLT; or
   by the primary OLT operating in an active mode, entering the standby mode in response to a timeout resulting from receiving no upstream signals from the ONTs.

22. The method of claim 21 wherein:
the downstream command from the primary OLT is a Time Division Multiple Access (TDMA) Grant Map.

* * * * *